United States Patent [19]
Kraft

[11] Patent Number: 5,526,360
[45] Date of Patent: Jun. 11, 1996

[54] HIGH SPEED N-TO-1 BURST TIME-MULTIPLEXED DATA TRANSMISSION SYSTEM AND METHOD

[75] Inventor: Clifford H. Kraft, Naperville, Ill.

[73] Assignee: Dade International Inc., Deerfield, Ill.

[21] Appl. No.: 375,543

[22] Filed: Jan. 25, 1995

Related U.S. Application Data

[63] Continuation of Ser. No. 905,758, Jun. 29, 1992, abandoned.

[51] Int. Cl.$^6$ ...................................................... H04J 3/04
[52] U.S. Cl. .......................... 370/112; 370/108; 327/407; 327/415
[58] Field of Search ................................ 370/112, 105.1, 370/105.4, 106, 110.1, 46, 108; 341/100, 101; 327/407, 415; 375/354, 365, 368

[56] References Cited

U.S. PATENT DOCUMENTS

| | | | |
|---|---|---|---|
| 2,953,694 | 9/1960 | Wilson | 307/88.5 |
| 3,496,546 | 2/1970 | Villafana et al. | 340/167 |
| 3,959,767 | 5/1976 | Smither et al. | 340/18 P |
| 4,027,301 | 5/1977 | Mayer | 340/183 |
| 4,208,724 | 6/1980 | Rattlingourd | 364/900 |
| 4,410,980 | 10/1983 | Takasaki et al. | 370/109 |
| 4,451,819 | 5/1984 | Beckenhauer | 340/347 |
| 4,485,470 | 11/1984 | Reali | 370/100 |
| 4,513,427 | 4/1985 | Borriello et al. | 375/110 |

(List continued on next page.)

FOREIGN PATENT DOCUMENTS

| | | |
|---|---|---|
| 88432 | 9/1983 | European Pat. Off. . |
| 186131 | 7/1986 | European Pat. Off. . |
| 232886 | 8/1987 | European Pat. Off. . |
| 283296 | 9/1988 | European Pat. Off. . |
| 363083 | 4/1990 | European Pat. Off. . |
| 2573939 | 5/1986 | France . |
| 3335397 | 4/1985 | Germany . |
| 57-45752 | 3/1982 | Japan . |
| 61-274438 | 12/1986 | Japan . |
| 63-114430 | 5/1988 | Japan . |
| 63-224496 | 9/1988 | Japan . |
| 2-63231 | 2/1990 | Japan . |
| 2113650 | 4/1990 | Japan . |
| 2243025 | 9/1990 | Japan . |
| 1338088 | 9/1987 | U.S.S.R. . |
| 15223385 | 11/1989 | U.S.S.R. . |
| WO8703439 | 6/1987 | WIPO . |
| WO8703434 | 6/1987 | WIPO . |

OTHER PUBLICATIONS

Nakamura, H., et al.; "2GHz Multiplexer and Demultiplexer Using DCFL/SBFL Circuit and the Precise $V_{th}$ Control Process"; IEEE GA AS IC Symposium, 1986; pp. 151–154.
Jeong, D; et al.; "Design of PLL–Based Clock Generation Circuits" IEEE Journal of Solid–State Circuits, vol. SC–22, No. 2, Apr., 1987; pp. 255–261.
Bayruns, R. J., et al.; "A Fine–Line NMOS 3–Gbit/s 12–Channel Time–Division Multiplexer/Demultiplexer Chip Set"; IEEE Journal of Solid State Circuits, vol. 24, No. 3, Jun., 1989; pp. 814–821.

Primary Examiner—Douglas W. Olms
Assistant Examiner—Ajit Patel
Attorney, Agent, or Firm—Kurt A. MacLean

[57] ABSTRACT

A high-speed burst digital time multiplexed data system has N parallel input data paths that are multiplexed onto a serial data path for transmission from a transmitter to a receiver. Serial transmission takes place in a short burst upon command at the transmitter. Data from the serial data path is demultiplexed back into N parallel data paths at the receiver. The entire process is accomplished asynchronously without the aid of a clock or framing signal. In the preferred embodiment, a train of N sampling pulses is generated by two tapped delay lines, one at the transmitter and one at the receiver. The length of each sequential sampling pulse is determined by the tap spacing of the delay line, and the duration of the entire burst process is equal to the total delay of the delay line. A new burst may be initiated at any time after the completion of the previous burst. Thus bursts may follow each other immediately or be arbitrarily spaced to occur whenever data transmission is required.

11 Claims, 4 Drawing Sheets

U.S. PATENT DOCUMENTS

| | | | |
|---|---|---|---|
| 4,680,759 | 7/1987 | Miller et al. | 370/112 |
| 4,763,327 | 8/1988 | Fontaine et al. | 370/112 |
| 4,779,268 | 10/1988 | Wissman | 370/106 |
| 4,841,522 | 6/1989 | Yamazaki | 370/58 |
| 4,899,339 | 2/1990 | Shibagaki et al. | 370/112 |
| 5,091,907 | 2/1992 | Woltengel | 370/112 |
| 5,111,455 | 5/1992 | Negus | 370/112 |
| 5,136,587 | 8/1992 | Obanu et al. | 370/112 |
| 5,150,364 | 9/1992 | Negus | 370/112 |

HIGH SPEED N-TO-1 BURST TIME-MULTIPLEXED DATA TRANSMISSION SYSTEM AND METHOD

This application is a continuation of now abandoned application Ser. No. 07/905,758, filed Jun. 29, 1992.

BACKGROUND OF THE INVENTION

1. Field of the Invention

This invention relates to a system and a method for multiplexing N parallel data paths onto a single serial data path.

2. Description of Related Art

It is known to use shift registers to accomplish time-division multiplexing. Such devices require, however, synchronized clock signals at both ends of a multiplex link, which usually means that it is necessary to transmit the clock signal over a separate link path.

In addition to a clock signal, it is also typically necessary to provide some sort of frame synchronization by transmitting a framing pulse or signal that indicates when the various shift registers of a system must all empty or load their contents. This increases the complexity of the transmission system even further.

What is needed is a data multiplexing and transmission system which does not require any external clock signal or framing pulse. It is the object of the invention to provide such a multiplexing and transmission system.

SUMMARY OF THE INVENTION

A data communication system comprises a multiplexer with at least N parallel input data paths, a serial output path, at least N internal gate devices, each connected to a corresponding one of the N parallel input data paths, and at least N parallel control lines, each connected to a corresponding one of the internal gate devices. The system also has a demultiplexer with a serial input path, at least N data storage elements, and at least N parallel output paths. The multiplexer and demultiplexer are connected by a serial transmission line or link.

A first signal delay and activation circuit generates a first series of sequential activation pulses to sequentially activate the internal gate devices to sequentially apply input data word bits to the transmission link. A second delay and activation circuit generates a second series of sequential activation pulses to sequentially enable inputs of the data storage devices, and sequentially load the data storage devices with data bits of the transmitted output word. The parallel data input word is thereby reconstructed in parallel form as the output signals from the demultiplexer.

In a preferred embodiment, the first and second signal delay and activation circuits include a first and a second tapped signal delay circuit, respectively, with a first and a second tapped input and at least N first and second signal taps and at least N+1 first and second tapped signals, as well as first and second combinatorial logic circuits for producing the first and second series of sequential activation pulses as predetermined logical combinations of the first and second tapped signals from adjacent ones of the first and second signal taps. Each first and second tapped signal is identical to but time-delayed relative to its immediately preceding first and second tapped signal, respectively.

In the preferred embodiment, the demultiplexer includes a digital latching device for sequentially loading and latching transmitted bits of the transmitted output data word. The digital latching device includes at least N stages, with each stage having a data output, a data input, and an enabling input. The enabling inputs are connected to the second logic means, with the second series of sequential activation pulses comprising enabling signals to the digital latching device.

Also in the preferred embodiment, the first and second tapped signal delay circuits are tapped digital delay lines and the digital latching device is an N-bit digital latch.

The first and second signal delay and activation circuits further include pulse matching means for generating the second series of sequential activation signals identical to but time-delayed relative to the first series of sequential activation signals.

A send command is generated by send signal generation means and used to start generation of the tapped signal. The send command can either be applied externally over a dedicated line, over a additional data input line, or, in the receiver, can be derived on the basis of an extra data bit encoded into the transmitted, serial data stream.

DETAILED DESCRIPTION

Figure 1:
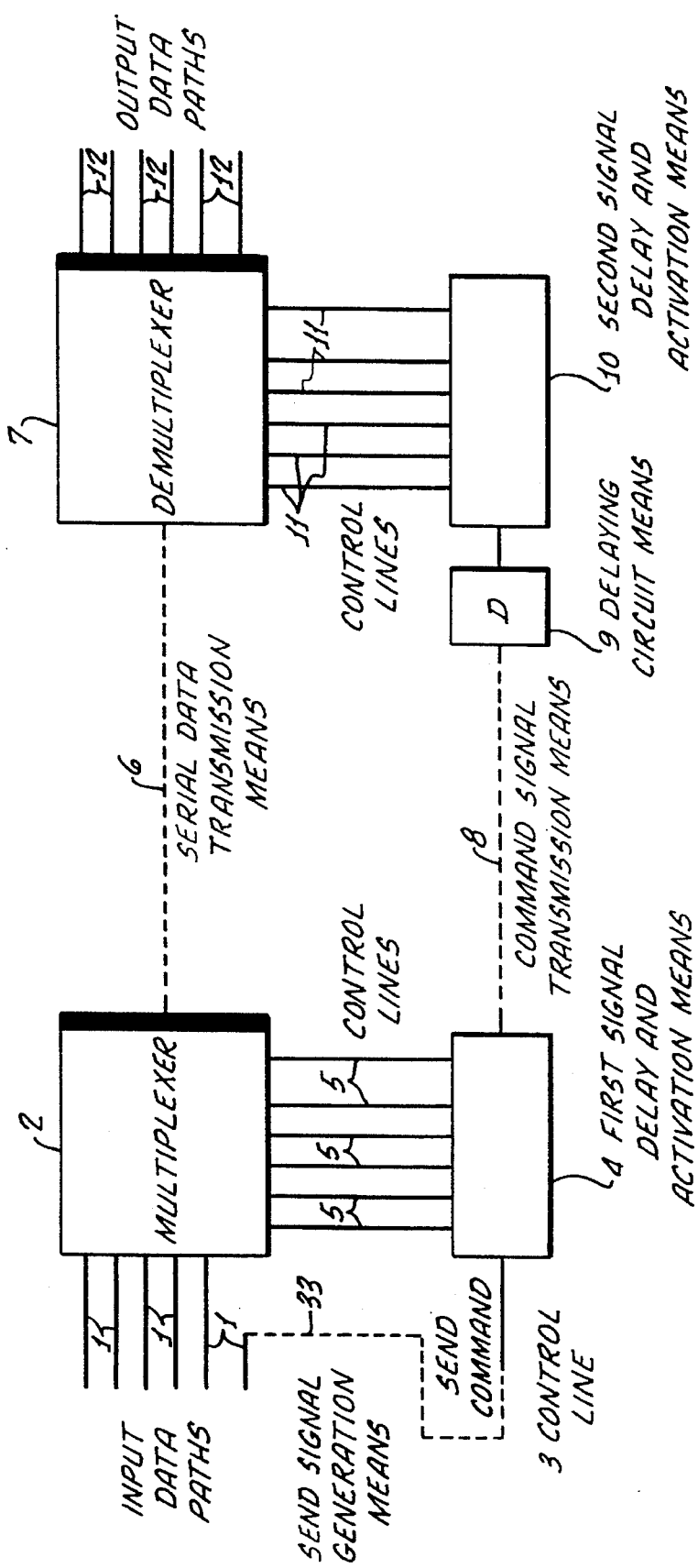
FIG. 1 is a block diagram that illustrates a preferred embodiment of a burst multiplexer system according to the invention.

FIG. 1 is a block diagram that illustrates the main components and connections of the burst multiplexing system according to the invention. Data is transmitted in parallel over a data bus 1 with at least N lines or data paths. The invention is suitable for multiplexing any number N of parallel data signals onto a single serial data path.

By way of example only, it is assumed below that each input data word is N bits wide, and that N=4. The multiplexing process can be continued to the case where N is any positive integer. The size of N is limited only by the stability of delay devices (described below).

The input data word is applied as parallel data to a digital multiplexer 2. The N data paths 1 are presented to the data input of the multiplexer 2 and are sampled and serialized for transmission as a sequential series of pulses over a transmission link or line 6 (or serial data transmission means 6). A Send command is also transmitted via a control line 3 to a tapped transmission delay circuit 4 (or first signal delay and activation means 4). The control line 3 may be a simple addition or part of the input data bus over which the N-path input data word is conveyed to the multiplexer 2, or it may be a separate line.

FIG. 1 shows the control line 3 connected to part of the input data bus 1 by send signal generation means 33.

The tapped transmission delay circuit 4 is connected to the multiplexer 2 via a series of at least N parallel control lines 5. As is described below, each control line 5 is used as an enabling or strobing signal to a logic gate. Sequential activation of control signals passed via the control lines 5 causes sequential selection of the N input data paths on the input lines 1.

The multiplexer 2 converts the parallel input data word into serial form. The serial data is transmitted via the transmission line or link 6 to a demultiplexer 7 that converts the serial data back into parallel form. The Send command is delayed in the tapped transmission delay circuit 4 (described below) and is also transmitted to the receiving device in any conventional manner, preferably via a control line or link 8, which may, but need not, be separate from the transmission line or link 6.

The delayed Send command is delayed by a predetermined amount in a delaying circuit 9 that may be implemented and tuned in a known manner so that the data bits transmitted in serial form over the line or link 6 are sampled by the demultiplexer 7 when their logical states have stabilized. Errors are, for example, typically reduced by timing a sampling signal so that a digital signal is sampled between potential rising and falling edges. Such timing of sampling of digital signals by delay of a sampling signal is known in the art. The delay circuit 9 is connected to a tapped reception delay circuit 10.

The tapped reception delay circuit 10 (or second signal delay and activation means 10; is connected to the demultiplexer 7 via at least N control lines 11. The tapped reception delay circuit 10 generates control pulses corresponding to the control pulses, conveyed via the control lines 5, used to sequentially activate the outputs of the multiplexer 2. Under the control of the control signals from the tapped reception delay circuit 10, the demultiplexer 7 sequentially loads the serial bits of the input data word transmitted over the link or line 6 to recreate the parallel input data word. The reconstructed parallel data word is output via at least N output data lines 12.

Figure 2:
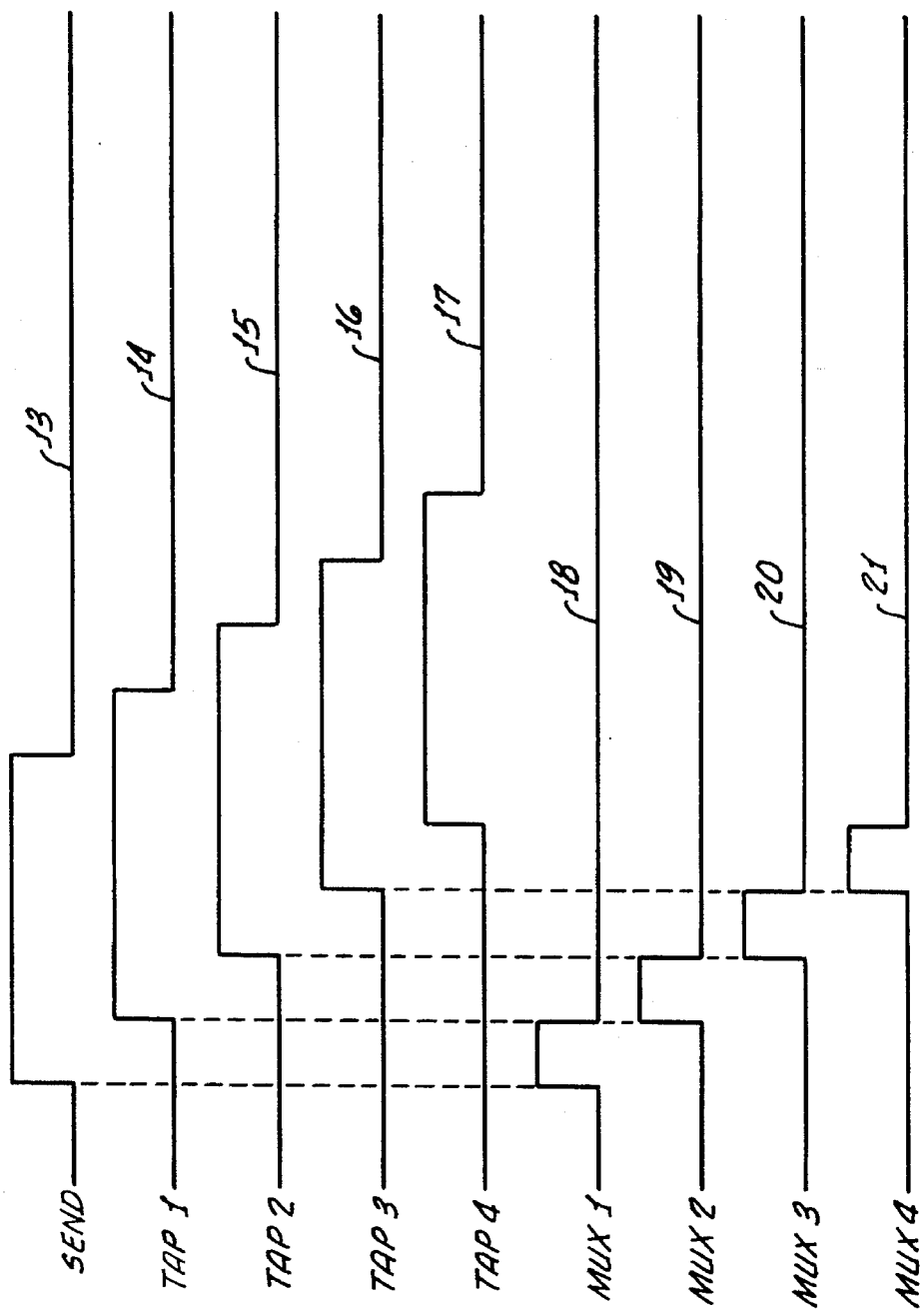
FIG. 2 is a timing diagram illustrating an example of waveforms for various control and data signals in the preferred embodiment.

FIG. 2 shows an example of the control signals used to activate the multiplexer 2 and the demultiplexer 7. As is illustrated below, the tapped transmission and reception delay circuits 4, 10, respectively, each have at least N output "taps", whereby the signal at each tap is the same as the signal at the immediately preceding tap delayed by one time unit. For the case in which N=4, there are therefore four taps for each of the delay circuits 4, 10. In FIG. 2, the Send command is shown as a binary pulse or rising edge. The signal at Tap1 is equivalent to the Send pulse delayed by one time unit. The signal at Tapm is, in general, equivalent to the Send pulse delayed by m time units. The Send pulse therefore corresponds to a non-delayed signal Tap0. In FIG. 2, the Send pulse and the four Tap pulses Tap1, Tap2, Tap3, and Tap4 are shown as wave forms 13, 14, 15, 16, and 17.

According to the invention, multiplexer activator signals are generated as pair-wise logical combinations of the Tap signals. The multiplexer activator signals are shown as Mux1, Mux2, Mux3, and Mux4, which are illustrated as wave forms 18, 19, 20, and 21, respectively, in FIG. 2. As FIG. 2 illustrates, the multiplexer activation pulses Mux1–Mux4, assume the logical HIGH state only for a period of time corresponding to one time unit or delay period, which is set in the system in a conventional manner. For example, the signal. Mux1 is HIGH only when the Send pulse (Tap0) is HIGH and the Tap1 pulse is LOW. In general, the signal Muxm is HIGH only when Tapm is LOW and Tap(m+1) is HIGH, where the Send signal is interpreted as Tap0. This logical operation can be expressed as follows: $Mux_m = AND(Tap_m, NOT(Tap_{m+1}))$.

The Tap delay circuits 4, 10 preferably include standard implementations of an analog or digital tapped delay line 31, 32 which shift the initial pulse (input tap) one step per time unit. One example of conventional components that are suitable for implementing the tapped delay lines are the "TTLDM" series of "Logic Delay Modules" manufactured by Engineered Components Co. ($EC^2$) of San Luis Obispo, Calif. These devices offer varying, evenly spaced delay periods and may be used to implement either fixed delay circuits or tapped delay lines. As such, these components may also be used to implement the delay circuit 9. The multiplexing signals Mux1–Mux4 thereby form a non-overlapping, parallel pulse train. As is described below, the multiplexing signals Mux1–Mux4 are used as selection and enabling signals for input and output circuits in the multiplexer 2 and demultiplexer 7.

Figure 3:
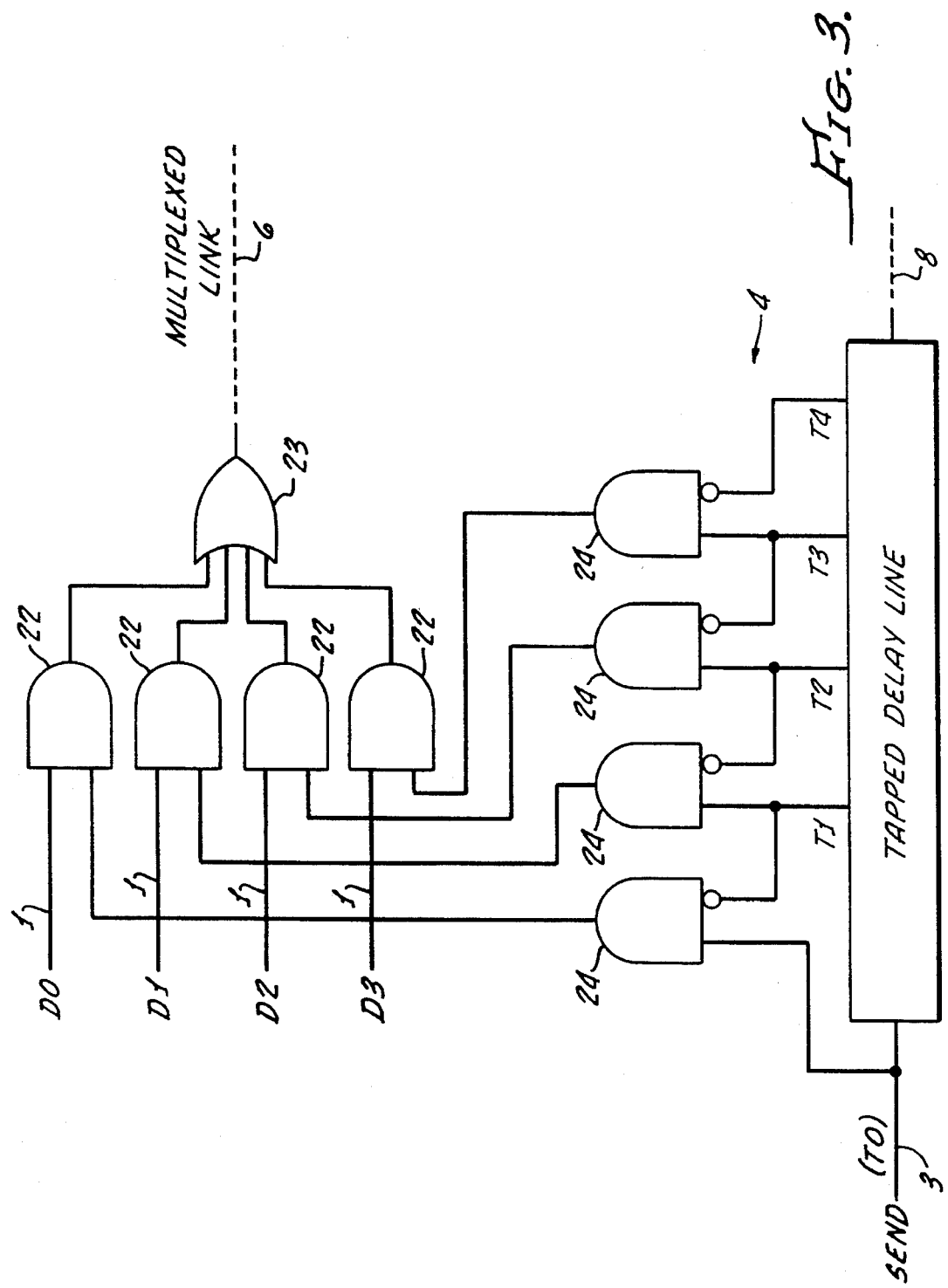
FIG. 3 is a logic diagram of the preferred embodiment of a multiplexer and control circuitry in a transmission section of the system according to the invention.

FIG. 3 illustrates one embodiment of the transmission portion of the system, which includes circuitry for implementing the multiplexer 2 and the tapped transmission delay circuit 4. The Send command 3, which may be a simple rising edge or a pulse, is applied to the input of the tapped transmission delay circuit 4, which produces a delayed series of rising edges or pulses. The tapped delay line has N taps (T1–T4, for N=4). For a Send pulse as in FIG. 2, the signals at the Taps T1–T4 will correspond to the signals Tap1–Tap4.

The delay circuitry also includes a series of N logic gates 24. Each logic gate 24 in the illustrated embodiment has two inputs, which are preferably formed by respective adjacent pairs of the signals at the taps T0–T4 (in which the Send command is considered as tap T0). The input connections to the gates 24 are such that one tap signal is connected directly to an input of the logic gate 24, whereas the delayed (by one time step) signal corresponding to the first input is connected to an inverting input of the same logic gate.

The gates 24 shown in FIG. 3 perform the logical AND function. The output from the left-most logic gate 24 (viewed as in FIG. 3) is therefore equal to AND(T0, NOT(T1)). The output from the second to left logic gate 24 is equal to AND(T1, NOT(T2)), etc. The outputs from the logic gates 24 therefore correspond to the multiplexing signals Mux1–Mux4, respectively, illustrated in FIG. 2.

The multiplexer 2 in the preferred embodiment includes four logic AND gates 22 whose outputs are connected as inputs to an N-input OR gate 23. Each AND gate 22 has two inputs, one of which is one of the data paths 1 over which the input data word is conveyed as the bits D0, D1, D2, and D3. The other input of each of these AND gates 22 is connected to the output from a respective one of the logic gates 24 in the tapped delay circuitry 4. Since the outputs from these gates 24 are the multiplexing signals Mux1–Mux4 (see FIG. 2), and since logic AND gates such as the gates 22 output a HIGH signal only when all of their respective inputs are also HIGH, the output from each gate 22 can be HIGH only when its corresponding input multiplexing signal is also HIGH.

As is well known, the output from an OR gate such as the gate 23 is HIGH when any or all of its inputs is logically HIGH. The output from the OR gate 23 will therefore be LOW whenever all of the outputs from the AND gate 22 are LOW, and will be HIGH whenever one or more of the AND gates 22 output a HIGH signal. Referring once again also to FIG. 2, since the multiplexing signals Mux1–Mux4 are non-overlapping, only one of the AND gates 22 will be able to output a HIGH signal at any given time.

Each AND gate 22 will output a HIGH signal only when its corresponding multiplexing signal Mux1–Mux4 is HIGH and its corresponding input data bit D0–D3 is HIGH; if the data bit is LOW and the multiplexing signal is HIGH, the output from the AND gate 22 will also be LOW. In other words, the output from each AND gate 22 will be equal to the input data bit D0–D3 whenever the corresponding multiplexing signal Mux1–Mux4 is HIGH; if the multiplexing signal is LOW, the AND gate will output a LOW signal regardless of the state of the data bit at its other input.

Because the multiplexing pulses are non-overlapping and are delayed by one time unit with respect to each other, the AND gate 22 will therefore be activated sequentially, meaning that they will sequentially output the state of the data bit D0–D3 connected as their other respective input. The output from the OR gate 23 will also correspond to the output from the activated AND gate 22, since all other AND gates 22 will output a LOW signal when any one of the AND gates 22 is activated.

The output from the OR gate 23 is connected to the transmission line or link 6. Because the AND gates are sequentially activated, the parallel data D0–D3 at the input to the multiplexer 2 will be sequentially output through the OR gate 23 as a series of bits onto the link 6. Once all of the data bits are output via the link 6, a new data word D0–D3 can be applied to the input lines 1 and converted to serial form by applying another Send pulse to the transmission delay circuit 4 via the line 3.

FIG. 3 shows only one example of logic gates that are suitable for performing the strobing operation used to sequentially select which data bit is to be passed through the OR gate 23 to the transmission link or line 6. Instead of having two separate AND gates 22, 24 for each data bit D0–D3, it would, for example, be possible to use a single 3-input AND gate with one of the inputs being inverted. Instead of the left-most AND gate 24 and the uppermost AND gate 22 (viewed as in FIG. 3), one could therefore, for example, have a single AND gate with D0 and T0 connected as non-inverted inputs and T1 connected as an inverted input. The combination of N gates 22 and gate 23 may also be implemented using a standard digital multiplexer, well known in the art.

In general, conventional logic gates or other logic circuits may be chosen arbitrarily that implement the following logical expression:

$$D0 \cdot T0 \cdot NOT(T1) + D1 \cdot T1 \cdot NOT(T2) + \ldots + D(N-1) \cdot T(N-1) \cdot NOT(TN)$$

where "o" indicates the logical AND operator, and "+" indicates the logical OR operator. The logic circuits use to implement this expression may also be programmable; one example of a suitable programmable logic device is the known 22V10 device made, for example, by Cypress Semiconductor of San Jose, Calif.

By manipulating this expression using known techniques, the correct logical function can be carried out using other types of logic gates. One advantage of the configuration shown in FIG. 3, however, is that the logic gates in each section are repetitive and can be implemented using easily available conventional integrated circuits, which typically include several identical logical gates per capsule.

Figure 4:
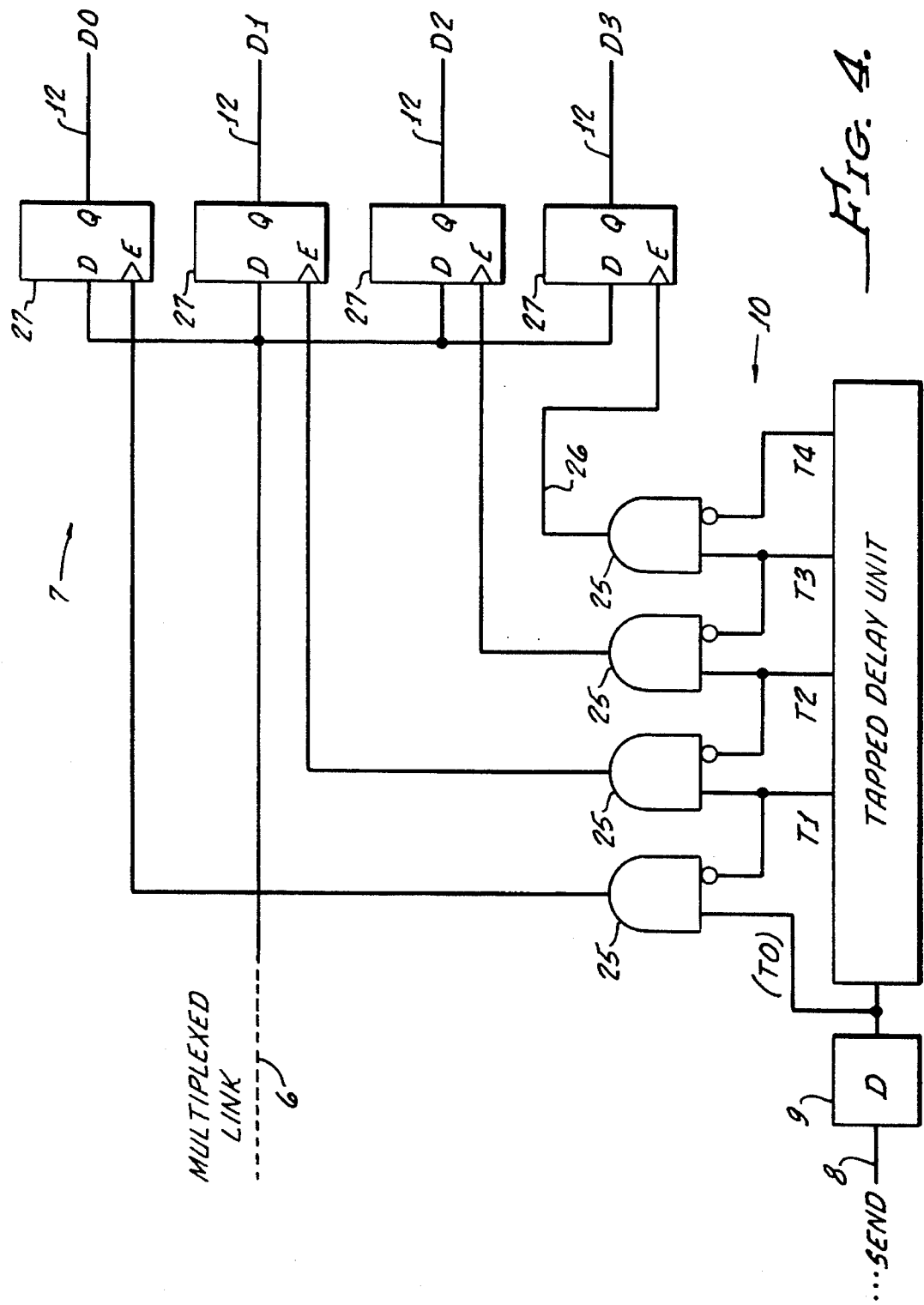
FIG. 4 is a logic diagram of the preferred embodiment of a demultiplexer and control circuitry in a reception section of the system according to the invention

FIG. 4 illustrates one implementation of the receiving station according to the invention, which includes the demultiplexer 7, the delaying circuit 9, and the tapped reception delay circuit 10. As FIG. 4 illustrates, the tapped reception delay circuit 10 preferably has substantially the same structure as the tapped transmission delay circuit 4 (see FIG. 3). The tapped reception delay circuit 10 includes a tapped delay line with four delayed taps T1–T4, an undelayed tap line T0, and four logic gates 25, each of which has an inverting and a non-inverting input.

As is described above with reference to the tapped transmission delay circuit 4, each logic gate 25 (analogous to the logic gates 24 above) forms an output signal that is HIGH only when one of the tapped input signals T0–T3 is HIGH and the respective, immediately following signal taps T1–T4 is LOW. For example, the output from the left-most logic gate 25 is HIGH only when the signal T0 is HIGH at the same time that the signal T1 is LOW.

The output of the second signal delay and activation circuit 10, therefore, is a series of sequential activation pulses to enable the data storage devices 27 of the demultiplexer 7.

The demultiplexer 7 includes N conventional data storage devices such as latches 27. As is well known in the art of digital design, the output Q of a digital latch assumes the same logical state as its input D when the latch is enabled, which, for bipolar devices, is typically on the rising or falling edge of an enabling signal E, that is, when the enabling signal changes from LOW to HIGH or vice versa. It is assumed by way of example only that the latches 27 are enabled on the rising edges of their respective enabling signals.

Any suitable conventional latches (including known, enabled latches) may be used, and the control of such latches is well understood in the field of digital design; since the multiplexing signals Mux1–Mux4 are non-overlapping, the latches will be activated or enabled sequentially regardless of the technology used to implement the latches 27. Suitable latches include, for example, the 20RA10 devices manufactured by Cypress Semiconductor.

As FIG. 4 illustrates, the data line or link 6 is connected as one input to all of the latches 27 in the demultiplexer 7. The outputs Q of the latches 27 form the N-bit output data word D0, D1, D2, D3 (for N=4), which is transmitted over the N-path parallel output line 12. The output signal from each of the logic gates 25 in the tapped reception delay circuit 10 is connected as the enabling signal E to a respective one of the latches 27.

The output from the logic gate 25 nearest the beginning of the data stream in the tapped delay line is thereby preferably connected as the enabling signal E of the uppermost latch 27 (viewed as in FIG. 4), which loads and outputs the data bit corresponding to the first data bit D0 in the word to arrive via the link 6. The output from the logic gate 25 that has the most delayed tapped signals (T3 and T4) as its inputs (viewed as in FIG. 4, the right-most gate) is similarly connected as the enabling signal of the latch that holds the last-to-arrive data bit D3 of the transmitted data word.

As before, as the Send signal propagates through the tapped delay line in the receiver, the outputs from the logic gates 25 will have the non-overlapping wave forms shown as the signals Mux1, Mux2, Mux3, and Mux4 shown in FIG. 2. In other words, the latches 27 will be sequentially enabled.

As is mentioned above, the purpose of the delay circuit 9 is to offset the timing in the receiver so that it occurs in approximately the center of each sampling interval. The delay circuit 9 may be implemented in a known manner preferably using a fixed (possibly non-tapped) delay line of delay equal to at least the set-up time of multiplexer latches 27.

The delay circuit 9 is thus preferably tuned in a conventional manner so that the output of the left-most gate 25 has a rising edge (goes from LOW to HIGH) when the input circuitry of the uppermost latch has stabilized on its input signal (is well between any rising and falling edges). When the first data bit arrives at the input to the latches 27, this data bit will then be loaded only into the upper-most latch, and will be loaded correctly, since the enabling signal E will fall when the input has stabilized.

Other timing arrangements and devices may be used, however, as long as conventional measures are taken to ensure that each latch 27 has sufficient set-up time so that it latches the correct input signal when enabled.

When the second data bit (corresponding to D1) arrives, the next logic gate 25 (connected to taps T1 and T2) will output a HIGH signal, whereas the non-overlapping output from the previous gate 25 will drop LOW. The latch with the output D1 will then be enabled and will correctly load and latch the second bit of the data word. This sequential enabling of the latches and loading of the serial data bits continues until all N data bits have been loaded into the latches 27. At that time, the outputs Q from the latches 27 will correspond to the input data word that was originally presented at the inputs of the multiplexer 2 (see FIG. 3). This means that the original parallel data word will have been reconstructed in the demultiplexer 7 using only the single serial line or link 6 and the single Send command over the line 8, with no need for a separate clock or framing signal.

The size of N and the absolute tap delay time is limited only by the stability of the various delay lines and circuits and the required set-up time of latches 27. The data width N can be increased or the tap time can be decreased until the timing jitter on the last gate output 26 (FIG. 4) violates the desired set-up time margin on the latches 27. The major limiting factor in performance is the absolute jitter of the last tap on either delay line with respect to the delay line input. The data width N is thus not restricted to four, but can take any positive integer value compatible with the jitter stability of the system as explained above.

The multiplexing system according to the invention needs no external clock signal or framing pulse in order to provide correct, high-speed N-to-1 multiplexing in a transmitting device and correct recovery of N-bit parallel data in a receiving device. In fact, if the first data sampling interval is dedicated to timing, it can alone act as the Send signal to provide all timing to the system. In this case, the transmission path need only be a single serial link and the separate line or link 8 can be omitted.

The single Send command or signal is all that is necessary according to the invention to initiate and complete the multiplexing and demultiplexing process in an asynchronous manner. If all sampling intervals (each corresponding to one of the Mux signals) are dedicated to data, it is necessary to transmit the Send command over a separate link path 8; however, this is much simpler than the transmission of a clock signal and a framing pulse, as it only needs to be a single rising edge.

It is not necessary, however, to transmit the Send signal over a separate line if the first sampling interval is a dedicated logical HIGH value. (Referring to FIG. 2, note that the rising edge of the Send pulse coincides with the rising edge of the first multiplexer activation signal Mux1.) In such case, a start time can be implied from the serial data path at the receiving location.

The N data bits can be sent in a burst (running as fast as the signal delay circuitry permits) with a relatively long pause between bursts, or bursts can be positioned back-to-back to accomplish data transmission at maximum speed. In a burst mode, the Send command is only issued when there is data to transmit. In the burst mode, the burst interval (the time it takes to send a complete data word) has a duration of N times the single tap delay of the tapped delay circuitry.

I claim:

1. A data communication system comprising:

a multiplexer with a plurality of parallel input data paths for receiving an input data word, the multiplexer further having a plurality of internal gate devices, each internal gate device connected to and receiving input from a corresponding one of the plurality of parallel input data paths, the multiplexer further having a plurality of parallel control lines, each control line connecting to and providing input to a corresponding one of the internal gate devices, and the multiplexer further having a serial output path logically connected to and receiving input from the plurality of internal gate devices;

a demultiplexer with a serial input path, a plurality of data storage devices for storing data, each data storage device receiving input from the serial input path, and the demultiplexer further having a plurality of parallel output data paths receiving input from a corresponding data storage device;

serial data transmission means for applying a transmitted output signal from the multiplexer at the serial output path of the multiplexer as a received input signal at the serial input path of the demultiplexer;

first signal delay and activation means having an input responsive to a command signal, the first signal delay and activation means for generating a first series of sequential activation pulses and for sequentially activating the plurality of internal gate devices to sequentially apply input data word bits to the serial data transmission means;

the first signal delay and activation means including:
  i) first tapped delay means with a first input tap, the first tapped delay means producing a delayed series of a plurality of first signal taps equivalent to the first input tap; and
  ii) a plurality of first logic means for producing the first series of sequential activation pulses as predetermined logical combinations of the first input tap and signal taps and the corresponding adjacent first signal taps; and second delay and activation means having an input responsive to a command signal, the second delay and activation means for generating a second series of sequential activation pulses, for sequentially enabling the plurality of data storage devices, and for sequentially loading the plurality of data storage devices with data bits of the transmitted output signal;

the second delay and activation means including:
  i) second tapped delay means with a second input tap, the second input tap being a delayed first input tap, the second tapped delay means producing a delayed series of a plurality of second signal taps equivalent to the second input tap; and
  ii) a plurality of second logic means for producing the second series of sequential activation pulses as predetermined logical combinations of the second input tap and signal taps and the corresponding adjacent second signal taps;

in which data outputs of the plurality of data storage devices are connected to the parallel plurality of output data paths, whereby an output data word comprising output signals of the data storage devices is identical to the input data word.

2. A system according to claim 1, in which:

the data storage devices of the demultiplexer include digital latching means for sequentially loading and latching transmitted bits of the transmitted output signal;

the digital latching means has a plurality of stages, with each stage having a data output, a data input, and an enabling input;

the enabling inputs are connected to the second logic means, with the corresponding second series of sequential activation pulses comprising enabling signals to the digital latching means.

3. A system according to claim 1, in which the first and second tapped signal delay means are tapped digital delay lines.

4. A system according to claim 2, in which the digital latching means is an N-bit digital latch.

5. A system according to claim 1 in which the first and second signal delay and activation means further include pulse matching means for generating the second series of sequential activation pulses identical to but time-delayed relative to the first series of sequential activation pulses.

6. A system according to claim 1, further including command signal transmission means for applying an output signal from the first signal delay and activation means as a second input tap to the second delay and activation means.

7. A system according to claim 1, further including delay circuit means for applying a send signal as the input to the second signal delay and activation means.

8. A system according to claim 7, in which the serial data transmission means comprises a single-channel transmission link over which the send signal is transmitted as a portion of the transmitted output signal.

9. A system according to claim 1, further including send signal generation means connected to at least one of the input data paths for internally generating a send command and for applying the send command as the input to the first signal delay and activation means.

10. A data communication system comprising:

a multiplexer having a plurality of internal gate devices, a plurality of parallel input data paths for receiving an input data word, and a plurality of first control lines, wherein each internal gate device is connected to and receives input from a corresponding one of the plurality of parallel input data paths and from a corresponding one of a plurality of first control lines, wherein each internal gate device is logically connected to and provides output to a serial data transmission line;

a demultiplexer having a plurality of data storage devices for storing data, each data storage device connected to and simultaneously receiving input from multiplexer via the serial data transmission line, wherein the data storage devices are connected to and receive input from a plurality of second control lines, wherein the plurality of data storage devices each have an output data path which together are a plurality of parallel data output paths for the demultiplexer;

first signal delay and activation means having an input responsive to a command signal, the first signal delay and activation means for generating a first series of sequential activation pulses and for sequentially activating the plurality of internal gate devices, said first signal delay and activation means further comprising:

a first tapped delay means with a first input tap, the first tapped delay means producing a delayed series of a plurality of first signal taps equivalent to the first input tap, and a plurality of first logic means for producing the first series of sequential activation pulses as predetermined logical combinations of the first input tap and signal taps and the corresponding adjacent first signal taps; and second delay and activation means having an input responsive to a command signal, the second delay and activation means for generating a second series of sequential activation pulses, for sequentially enabling the plurality of data storage devices, and for sequentially loading the plurality of data storage devices with data bits of the transmitted output signal, said second delay and activation means further comprising:

a second tapped delay means with a second input tap, the second input tap being a delayed first input tap, the second tapped delay means producing a delayed series of a plurality of second signal taps equivalent to the second input tap, and a plurality of second logic means for producing the second series of sequential activation pulses as predetermined logical combinations of the second input tap and signal taps and the corresponding adjacent second signal taps; and wherein an output data word from the plurality of parallel data output paths for the demultiplexer is identical to the input data word.

11. A system according to claim 10, in which:

the data storage devices of the demultiplexer includes digital latching means for sequentially loading and latching transmitted bits of the transmitted output signal;

the digital latching means has a plurality of stages, with each stage having a data output, a data input, and an enabling input; and the enabling inputs are connected to the second logic means, with the corresponding second series of sequential activation pulses comprising enabling signals to the digital latching means.

* * * * *